(12) United States Patent
Park et al.

(10) Patent No.: US 11,724,701 B2
(45) Date of Patent: Aug. 15, 2023

(54) TERMINAL DEVICE, PERSONAL MOBILITY, METHOD FOR CONTROLLING THE PERSONAL MOBILITY

(71) Applicants: Hyundai Motor Company, Seoul (KR); Kia Motors Corporation, Seoul (KR)

(72) Inventors: Minjae Park, Gyeonggi-do (KR); Jong Bok Lee, Gyeonggi-do (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 17/060,439

(22) Filed: Oct. 1, 2020

(65) Prior Publication Data

US 2021/0316735 A1 Oct. 14, 2021

(30) Foreign Application Priority Data

Apr. 8, 2020 (KR) .................. 10-2020-0042623

(51) Int. Cl.
*B60W 40/08* (2012.01)
*G08G 1/00* (2006.01)
(Continued)

(52) U.S. Cl.
CPC .............. *B60W 40/08* (2013.01); *B60Q 1/32* (2013.01); *B60Q 1/34* (2013.01); *B60Q 1/44* (2013.01);
(Continued)

(58) Field of Classification Search
CPC ...... B60W 40/08; B60W 10/08; B60W 10/30; B60W 50/14; B60W 2554/80;
(Continued)

(56) References Cited

U.S. PATENT DOCUMENTS 9,026,367 B2 * 5/2015 Paek .................. G01C 21/3415
709/219
11,498,478 B2 * 11/2022 Wendt .................... B60Q 1/085
(Continued)

FOREIGN PATENT DOCUMENTS

| CA | 2699628 A1 * | 3/2009 | ............. G01B 11/14 |
| WO | WO-2009035705 A1 * | 3/2009 | ............. G01B 11/14 |
| WO | WO-2013090125 A1 * | 6/2013 | ............. B60K 35/00 |

OTHER PUBLICATIONS

S. Panwai et al., "Comparative Evaluation of Microscopic Car—Following Behavior," 2005, vol. 6, Publisher: IEEE.*

*Primary Examiner* — Tuan C To
(74) *Attorney, Agent, or Firm* — Fox Rothschild LLP

(57) ABSTRACT

A terminal device and a personal mobility communicating with terminal device are disclosed. The personal mobility receives gesture information about a leader gesture recognized by a terminal when in a leader state while performing a group riding mode. Additionally, the personal mobility identifies intention information corresponding to the received gesture information and transmits the identified intention information to another personal mobility in the follower state. At least one of a illuminator or sound output are operated based on the identified intention information and the transmitted intention information from the personal mobility in the leader state is displayed through display while performing the group riding mode.

15 Claims, 8 Drawing Sheets

(51) Int. Cl.
*G06K 9/00* (2022.01)
*B60W 50/14* (2020.01)
*B60W 10/30* (2006.01)
*B60W 10/08* (2006.01)
*B60Q 1/44* (2006.01)
*B60Q 1/32* (2006.01)
*B60Q 1/46* (2006.01)
*B60Q 1/34* (2006.01)
*G06V 40/20* (2022.01)

(52) U.S. Cl.
CPC .............. *B60Q 1/46* (2013.01); *B60W 10/08* (2013.01); *B60W 10/30* (2013.01); *B60W 50/14* (2013.01); *G06V 40/28* (2022.01); *G08G 1/22* (2013.01); *B60W 2040/0881* (2013.01); *B60W 2050/146* (2013.01); *B60W 2300/36* (2013.01); *B60W 2420/42* (2013.01); *B60W 2554/80* (2020.02)

(58) Field of Classification Search
CPC ... B60W 2040/0881; B60W 2050/146; B60W 2300/36; B60W 2420/42; B60Q 1/32; B60Q 1/34; B60Q 1/44; B60Q 1/46

USPC ......................................................... 701/117
See application file for complete search history.

(56) References Cited

U.S. PATENT DOCUMENTS

| | | | |
|---|---|---|---|
| 2009/0276154 A1* | 11/2009 | Subramanian | G01C 21/20 701/469 |
| 2014/0005941 A1* | 1/2014 | Paek | G01C 21/3415 701/538 |
| 2014/0358368 A1* | 12/2014 | Entenmann | B60K 37/06 701/36 |
| 2014/0361989 A1* | 12/2014 | Entenmann | B60K 37/06 345/156 |
| 2015/0025740 A1* | 1/2015 | Cartarius | B60W 50/10 701/36 |
| 2017/0219363 A1* | 8/2017 | Paek | G01C 21/362 |
| 2019/0272759 A1* | 9/2019 | Liu | G08G 1/096883 |
| 2020/0056899 A1* | 2/2020 | Gandiga | G08G 1/096827 |
| 2020/0142429 A1* | 5/2020 | Kama | B60W 30/165 |
| 2021/0253193 A1* | 8/2021 | Liu | B62K 3/002 |

\* cited by examiner

FIG. 4
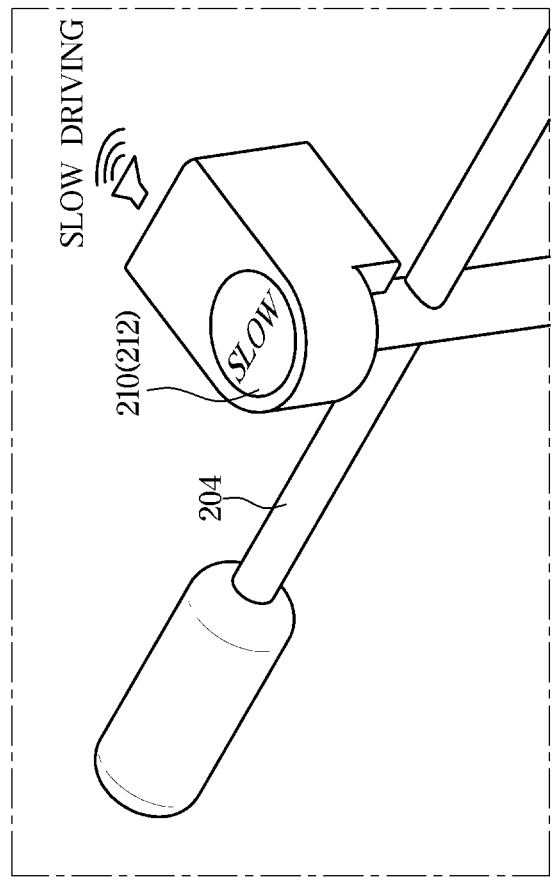
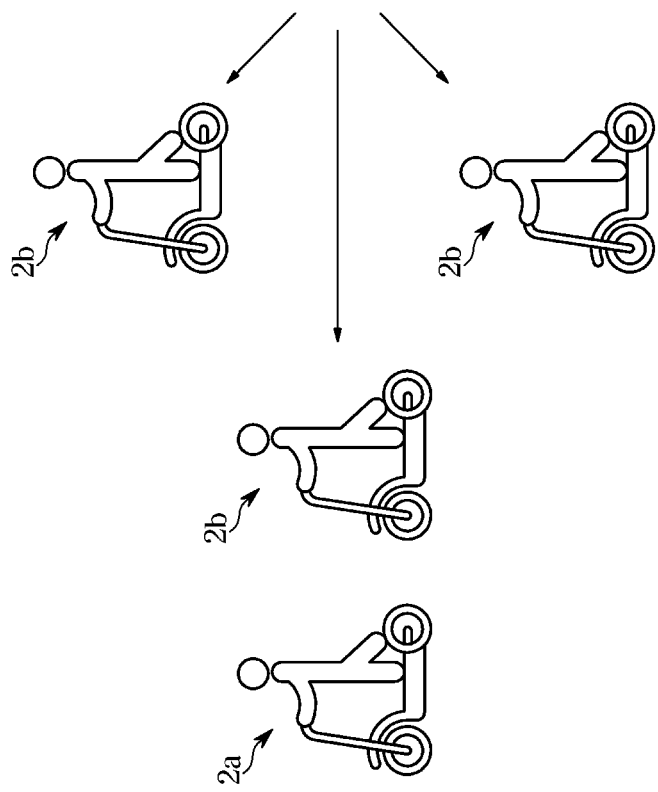

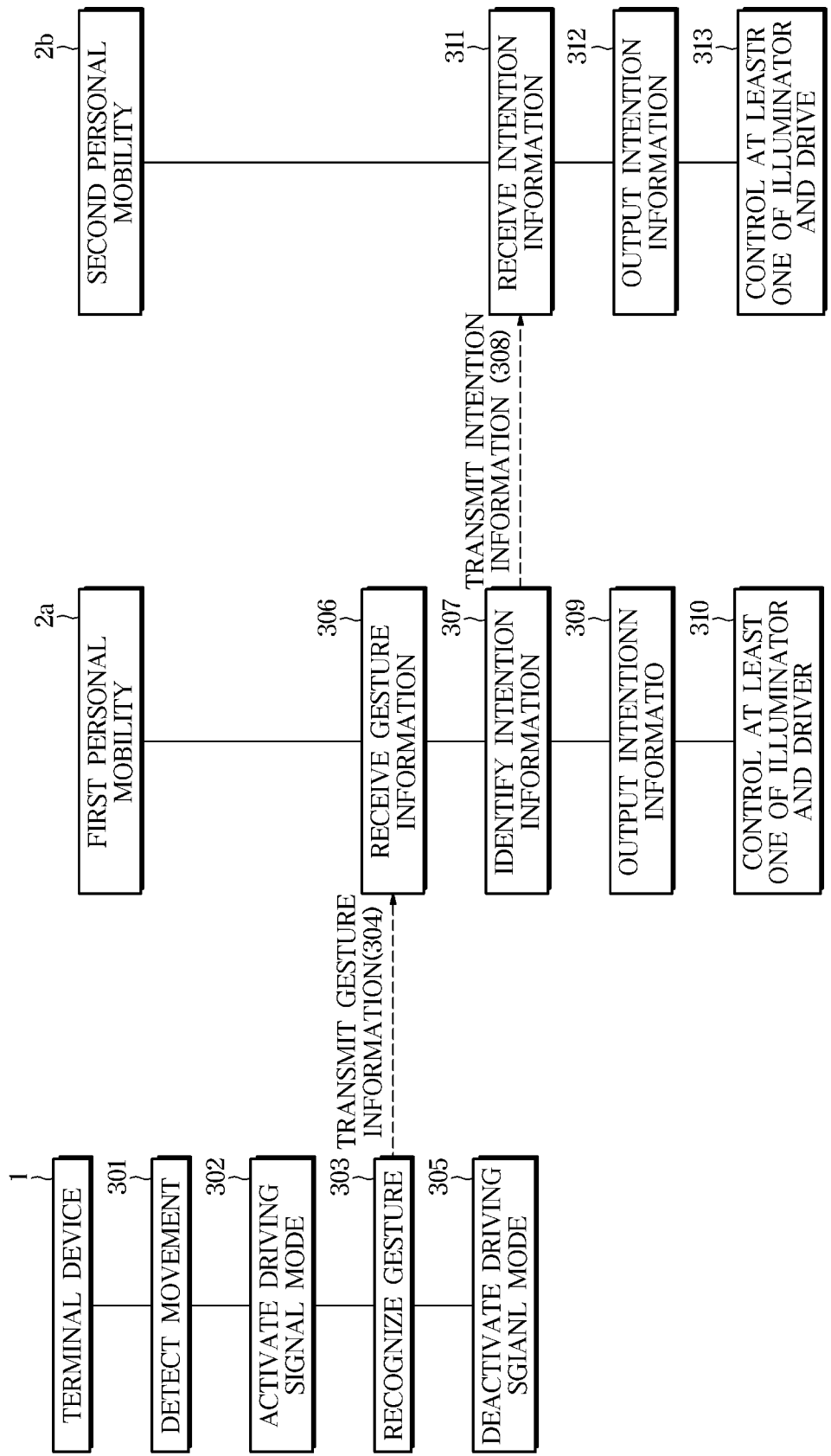

FIG. 6

| INTENTION (GESTURE) | FIRST PERSONAL MOBILITY | SECOND PERSONAL MOBILITY |
|---|---|---|
| SLOW DRIVING | BRAKING LAMP FLASHING | DISPLAY SLOW DRIVING ICON, BRAKING LAMP FLASHING |
| STOP | INCREASED BRIGHTNESS OF BRAKING LAMP | DISPLAY STOP ICON, INCREASED BRIGHTNESS OF BRAKING LAMP |
| OBSTACLE ATTENTION | BRAKING LAMP FLASNING AND WARNING SOUND OUTPUT | DISPLAY OBSTACLE ATTENTION ICON, BRAKING LAMP FALSHING AND WARNING SOUND OUTPUT |
| LEFT TURN | LEFT INDICATOR LAMP FLASHING | DISPLAY LEFT DIRECTION ARROW, LEFT DIRECTION INDICATOR FLASHING |
| RIGHT TURN | RIGHT INDICATOR LAMP FLASHING | DISPLAY RIGHT DIRECTION ARROW, RIGHT DIRECTION INDICATOR LAMP FLASHING |
| OVERTAKING | LAMP GRADIENT ON FOR WARNING NOTIFICATION | DISPLAY OVERTAKING ICON, LAMP GRADIENT ON FOR WARNING NOTIFICATION |
| SINGLE LINE DRIVING | WARNING NOTIFICATION LAMP ON | DISPLAY SINGLE LINE DRIVING ICON, WARNING NOTIFIACTION LAMP ON |
| TWO LINE DRIVING | LEFT/RIGHT DIRECTION INDICATOR LAMP ON | DISPLAY TWO LINE DRIVING ICON, LEFT/RIGHT DIRECTION INDICATOR LAMP ON |
| FAILURE | BRAKING LAMP FLASHING AND WARNING SOUND OUTPUT | DISPLAY FAILURE ICON, BRAKING LAMP FLSHING AND WARNING SOUND OUTPUT |
| CHARGING | WARNING NOTIFICATION LAMP ON | DISPLAY CHARING ICON, WARNING LAMP ON |
| COLLISION ATTENTION | BRAKING LAMP FLASHING AND WARNING SOUND OUTPUT | DISPLAY COLLISION ATTENTION ICON, BRAKING LAMP FLASHING AND WARNING SOUND OUTPUT |
| ROAD SURFACE ATTENTION | BRAKING LAMP FLASHING AND WARNING SOUND OUTPUT | DISPLAY ROAD SURFACE ATTENTION ICON, BRAKING LAMP FLASHING AND WARNIGN SOUND OUTPUT |

TERMINAL DEVICE, PERSONAL MOBILITY, METHOD FOR CONTROLLING THE PERSONAL MOBILITY

CROSS-REFERENCE TO RELATED APPLICATION(S)

This application is based on and claims priority under 35 U.S.C. § 119 to Korean Patent Application No. 10-2020-0042623, filed on Apr. 8, 2020 the disclosure of which is incorporated by reference in its entirety.

BACKGROUND

1. Technical Field

The present disclosure relates to a personal mobility communicating with a terminal device, and controlling method thereof.

2. Description of the Related Art

Recently, a development of a single-person vehicle called personal mobility has increased due to environmental regulations and an increase in metropolitan cities. The personal mobility is a medium/short range mobile device that combines electric charging and power technologies, and is also referred to as smart mobility and micro mobility. In other words, personal mobility does not emit environmental pollutants since the power is electricity. In addition, personal mobility is in the spotlight as a mobile device that is easy to carry and copes easier with traffic jams and parking problems.

SUMMARY

In view of the above, an aspect of the present disclosure provides a terminal that transmits recognized gesture in the terminal to the personal mobility. Another aspect provides a personal mobility and a control method for controlling at least one of a display, a illuminator, a driver, and a sound output based on gesture information transmitted from a terminal. Another aspect provides a personal mobility and a control method for controlling at least one of a display, a illuminator, a driver, and a sound output based on a gesture of a reader recognized by the image acquirer.

In accordance with an aspect of the present disclosure, a terminal device may include a communicator configured to perform communication with personal mobility; a detector configured to output detection signal by detecting movement of user; a storage configured to store intention information that corresponds to gesture; a controller configured to recognize user gesture based on the detection signal, identify user intention information corresponding to the recognized user gesture, operate the communicator to transmit the identified user intention information to the personal mobility.

The controller may be configured to operate the communicator to transmit the user intention information to other personal mobility in the surroundings located within a preset range. Additionally, the controller may be configured to operate the communicator to transmit user intention information to the other personal mobility when the other personal mobility is in a group riding state. The intention information may include at least one of acceleration, braking, slow riding, stop, attention, left turn, right turn, overtaking, single line driving, and two line driving.

The terminal device may further include: a user interface configured to receive user input and display action information. The terminal device may include a main body provided with the user interface; a band configured to connect to the main body and provided to be worn on a user's body or clothing.

The controller may be configured to recognize the gesture based on the received detection signal when the detection signal of the detector is received while the driving signal mode is deactivated, and activate the driving signal mode and initiate communication with the personal mobility when information regarding the recognized gesture is determined as information on the starting gesture, and recognize user's gesture based on the received detection signal and identify leader's intention information corresponding to the recognized user gesture when the detection signal of the detector is received during communication with the personal mobility.

The controller may be configured to recognize the gesture based on the detection signal and check the number of times the same gesture was recognized, and identify user's intention information corresponding to the recognized gesture in response to determining that the identified number of times is a preset number of times. The detector may include a camera configured to capture an image of the upper body among the user's body.

In accordance with an aspect of the present disclosure, a personal mobility may include a display; a communicator configured to perform communication with terminal device and the other personal mobility; a storage configured to store intention information corresponding to gesture information; and a controller configured to check the intention information corresponding to the received gesture information when the gesture information is received through the communicator, operate the communicator to transmit the checked intention information to the other personal mobility, and operate the display to display the checked intention information.

The controller may be configured to check a direction to transmit the intention information based on the gesture information, and transmit the intention information to another personal mobility located in the checked direction among the other personal mobility. The direction to transmit the intention direction may be a relative direction to the personal mobility. The communicator may be configured to receive present location information and location information of the other personal mobility, and the controller may be configured to recognize direction of the other personal mobility based on the received present location and the location information of the other personal mobility by the communicator.

The intention information may include at least one of acceleration, braking, slow riding, stop, rearward-attention, forward-attention, obstacle attention, left turn, right turn, overtaking, single line driving, and two line driving, and the overtaking and rearward-attention may include direction information corresponding to the front side, the slow riding, obstacle attention, left turn, right turn may includes direction information corresponding to the rear side, and the single line driving, two line driving, failure and charging may include direction information corresponding to the front side and rear side.

The personal mobility may further include a illuminator configured to perform turning on light, turning off light, or flashing; and a sound output configured to output sound. The controller may be configured to execute at least one of actions of the illuminator and the sound output based on the checked intention information. The other personal mobility may include personal mobility devices located within a preset range.

The controller may be configured to operate the communicator to transmit the user's intention information to the other personal mobility when the other personal mobility is in a group riding state. The controller may be configured to recognize the gesture by the received gesture information and check the number of times the same kind of gesture was recognized, and identify user's intention information corresponding to the recognized gesture in response to determining that the identified number of times is a preset number of times. The controller may be configured to activate driving signal mode when information on the received gesture information is determined as starting gesture, and identify user's intention information corresponding to the received gesture information through the communicator when the driving signal mode is in activation state.

The personal mobility may further include a board; at least one wheel provided on the board and rotated by a motor; a brake indicator lamp provided on the rear side of the board, a left direction indicator lamp provided on the left side of the board, a right direction indicator lamp provided on the right side of the rear side of the board, or a warning indicator lamp provided on the bottom surface of the board.

The controller may be configured to execute operation of the motor based on the identified intention information in response to determining that the motor is in follower state while performing the group riding mode. The personal mobility may further include an image acquirer configured to acquire a front side image; and the controller may be configured to recognize leader's gesture and identifies intention information corresponding to the gesture information regarding the recognized gesture by checking movement direction of arms and hands of the leader based on the acquired image when in the follower state while performing the group riding mode.

The controller may be configured to check size of the personal mobility that is the leader status in the acquired image when the follower status is being performed while performing the group riding mode, acquire gesture information by recognizing a gesture through the acquired image when the checked size is a predetermined size or more, and receive gesture information from the personal mobility in the leader status when the checked size is less than the predetermined size.

The personal mobility may further include a distance detector configured to detect a distance with the personal mobility in the leader state. The controller may be configured to acquire gesture information by recognizing gesture through the acquired image when the detected distance is predetermined distance or greater in the follower state while performing the group riding mode, and receive the gesture information from the personal mobility in the leader state when the detected distance is less than the predetermined distance.

In accordance with an aspect of the present disclosure, a control method of a personal mobility, the method may include receiving gesture information regarding leader gesture recognized by a terminal when in a leader state while performing a group riding mode; identifying intention information corresponding to the received gesture information; transmitting the identified intention information to the personal mobility in the follower state; operating at least one of a illuminator or sound output based on the identified intention information; and displaying transmitted intention information from the personal mobility in the leader state through display when in the follower state while performing the group riding mode.

The method may further include operating at least one of illuminator or sound output based on the transmitted intention information from the personal mobility in the leader state when in the follower state while performing the group riding mode. The method may further include activating image acquirer when in the follower state while performing the group riding mode; recognizing leaders' gesture based on acquired image by the image acquirer; and identifying intention information corresponding to the recognized gesture. Additionally, the method may include transmitting the intention information to the other personal mobility in the follower state when in the follower state while performing the group riding mode.

According to a server and a controlling method according to one aspect, by determining the risk for personal mobility based on personal mobility and information received from the vehicle and providing notification information about the risk, it may be possible to prevent an accident between the personal mobility and the vehicle.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 4 is an exemplary diagram of group riding of personal mobility according to an exemplary embodiment.

FIG. 5 is a control flowchart of a terminal and first and second personal mobility according to an exemplary embodiment.

FIG. 6 is an example of control of personal mobility according to an exemplary embodiment.

DETAILED DESCRIPTION

Figure 1:
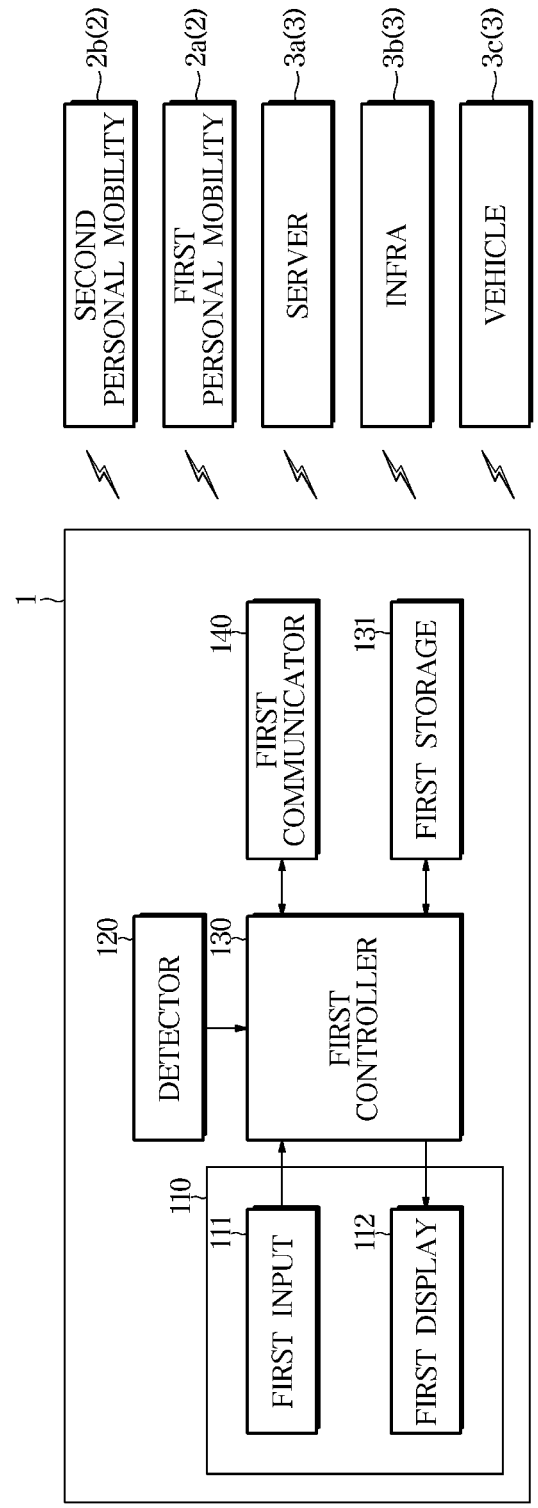
FIG. 1 is a control configuration diagram of a terminal according to an exemplary embodiment.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Like reference numerals refer to like elements throughout. The present disclosure does not describe all elements of the exemplary embodiments, and overlaps between the general contents or the embodiments in the technical field to which the present invention belongs.

This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component, It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network. In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members. The terms first, second, etc. are used to distinguish one component from another component, and the component is not limited by the terms described above. Singular expressions include plural expressions unless the context clearly indicates an exception. In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present invention.

FIG. 1 is a control configuration diagram of a terminal according to an exemplary embodiment. A terminal device 1 is a user terminal, and the terminal device may be embodied as a computer or a portable terminal capable of accessing the personal mobility 2 through a network. In particular, the terminal device 1 may include, for example, a laptop equipped with a web browser, a desktop, a laptop, a tablet PC, a slate PC, and the like, and the portable terminal may include all kinds of handheld based wireless communication devices guaranteed portability and mobility such as PCS (Personal Communication System), GSM (Global System for Mobile communications), PDC (Personal Digital Cellular), PHS (Personal Handyphone System), PDA (Personal Digital Assistant), International Mobile Telecommunication (IMT)-2000, Code Division Multiple Access (CDMA)-2000, W-Code Division Multiple Access (W-CDMA), WiBro (Wireless Broadband Internet) terminal, such as a smart phone, or wearable devices such as head-mounted-devices (HMDs), watches, rings, bracelets, anklets, necklaces, glasses, contact lenses.

As described above, wearable devices are various devices that a user may wear on a body or clothing, the wearable device may be, for example, a smart watch, smart band, wearable computer, Bluetooth headset, smart wear, or the like. The terminal device 1, which is a wearable device, may be configured to communicate with the personal mobility 2 while being worn by the user.

The terminal device 1 may be configured to detect a user's motion and a motion state for a change in motion, and transmit information regarding the detected motion state to the personal mobility 2. The terminal device 1 may include a first user interface 110, a detector 120, a first controller 130, a first storage 131, and a first communicator 140. In addition, to distinguish between components having the same name between terminal device 1 and personal mobility 2, 'first' is written in the component part of terminal device 1, and 'second' is written in the component part of personal mobility 2.

The first user interface 110 may be configured to receive user input, display information regarding an operation being performed in the terminal, and display information corresponding to the user input. The first user interface 110 may include a first input 111 and a first display 112. The first input 111 may include a hardware device such as buttons, switches, pedals, keyboards, mice, track-balls, various levers, handles or sticks for user input.

Additionally, the first input 111 may include a graphical user interface (GUI), such as a touch pad for user input, that is, a software device. The touch pad may be implemented as a touch screen panel (TSP) to form a mutual layer structure with the first display 112. The first input 111 may be configured to receive operation commands and destination information of a navigation function.

The first input 111 may be configured to receive a transmission command of a user input to the first personal mobility 2a, and may be configured to receive a pairing command of the first personal mobility 2a and a communication command with the first personal mobility 2a. The first input 111 may also be configured to receive a group riding command and information regarding the leader status.

The first display 112 may be configured to display information on gesture registration and gesture guidance. The first display 112 may include a cathode ray tube (CRT), a digital light processing (DLP) panel, a plasma display penal, a liquid crystal display (LCD) panel, and electricity. Electroluminescence (EL) panels, electrophoretic display (EPD) panels, electrochromic display (ECD) panels, light emitting diode (LED) panels, or organic light emitting diodes: OLED) panels, but is not limited thereto.

When configured as a touch screen panel (TSP) forming a mutual layer structure with a touch pad, the display unit may also be used as an input. The first display 112 may also be configured to display interlocking information with the first personal mobility 2a. The first display 112 may also be configured to display the riding information of the first personal mobility 2a and the riding information of the second personal mobility 2b during group riding.

The first display 112 may be configured to display navigation information when performing the navigation function. The first display 112 may be configured to display the remaining distance to the destination, the remaining time to the destination, and the arrival time of the destination, and may be configured to display the user's schedule information. The first display 112 may also be configured to display information regarding the battery charge of the terminal and communication connection information with the first personal mobility 2a. Additionally, the first display 112 may be configured to display the battery charge amount information of the first personal mobility 2a and the movable distance information and the movable time information that may be moved to the first personal mobility 2a.

The detector 120 may be configured to detect the movement of terminal device 1 and output a signal for the detected movement. In particular, the movement of the terminal device 1 may be a movement of the body of a user wearing the terminal device 1. The detector 120 may include at least one of an acceleration sensor, a gyro sensor, a collision sensor, a geomagnetic sensor, and a position sensor. The detector 120 may be a proximity sensor, and may also include at least one of an optical sensor, an ultrasonic sensor, and a capacitive sensor.

Terminal device 1 may also include a camera (not shown) for acquiring an image of a user (i.e., a reader) of the first personal mobility. In particular, terminal device 1 may be configured to recognize a gesture captured by a reader based on image information acquired by the camera and output gesture information for the recognized gesture. The first controller 130 may be configured to recognize a gesture that corresponds to the movement of the terminal device 1 based on the signal output from the detector 120 and output gesture information for the recognized gesture.

The gesture corresponding to the movement of the terminal is a gesture for the movement of the body of the leader wearing terminal device 1, and may be a hand signal gestured by the intention of the leader. The gesture information may be information regarding a change in the position of the body movement, and may include direction information and distance information about the body movement. The first controller 130 may be configured to transmit gesture information regarding the recognized gesture to the first personal mobility 2a.

The first controller 130 may be configured to check the hand signal information corresponding to the gesture information for the recognized gesture, and transmit the checked hand signal information to the first personal mobility 2a, and check the leader's intention information corresponding to the gesture information for the recognized gesture, and transmit the confirmed leader's intention information to the first personal mobility 2a.

The first controller 130 may also be configured to directly transmit at least one of the identified hand signal information, gesture information, and intention information of the reader to the second personal mobility 2b. The first controller 130 may be configured to activate driving signal mode in response to receiving the detection signal of detector 120 while driving signal mode is deactivated, and initiate communication with the 1st personal mobility when the detection signal of the detector 120 is received during communication with the first personal mobility, and recognize the gesture based on the received detection signal.

The first controller 130 may be configured to recognize a gesture based on the received detection signal, but may be configured to check the number of times the same gesture is recognized. In response to determining that the determined number of times is a preset number of times, the first controller 130 may be configured to transmit gesture information on the recognized gesture to the first personal mobility 2a. The first controller 130 may be configured to recognize a gesture based on the received detection signal, and activate the driving signal mode and initiate communication with the first personal mobility in response to that the information on the recognized gesture is information regarding the starting gesture, and recognize a gesture based on the received detection signal in response to receiving a detection signal of the detector 120 during communication with the first personal mobility.

The first controller 130 may also be configured to transmit the detection signal of the detector 120 to the first personal mobility 2a. In particular, the first personal mobility 2a may be configured to recognize a gesture based on the received detection signal and check the reader's intention information corresponding to the recognized gesture. The first controller 130 may be configured to recognize a gesture based on the received detection signal, activate driving signal mode in response to determining that the information regarding the recognized gesture is information about the starting gesture, and initiate communication with the first personal mobility, and may be configured to transmit the received detection signal to the first personal mobility 2a in response to receiving the detection signal of detector 120 during communication with the first personal mobility.

The first controller 130 may also be configured to transmit the detection signal of the detector 120 to the second personal mobility 2b. In particular, the second personal mobility 2b may be a personal mobility located within a preset range with the terminal device. The second personal mobility 2b may be a personal mobility located within a preset range with the first personal mobility, and may be the personal mobility performing group riding with the first personal mobility.

The second personal mobility 2b may be a personal mobility disposed in front of the first personal mobility, and it may be a personal mobility disposed behind the first personal mobility. In particular, the preset range may include an area within a distance capable of visually recognizing a user's gesture of the first personal mobility in all directions in front, rear, left, and right based on the first personal mobility.

In the preset range, a direction and a distance may be set according to a user's selection. The preset range may be variably set according to environmental information such as weather, season, and time. Particularly, the second personal mobility 2b may be configured to recognize the gesture based on the received detection signal and check the reader's intention information corresponding to the gesture information for the recognized gesture.

The first controller 130 may also be configured to receive the identification information of at least one second personal mobility 2b for group riding through the first communication unit and store the identification information of the received at least one second personal mobility 2b. The first controller 130 may be configured to acquire the movement speed of the terminal based on the signal output from the detector 120. In particular, the moving speed of the terminal may be the driving speed of the first personal mobility 2a. In other words, the first controller 130 may be configured to indirectly acquire the driving speed of the first personal mobility 2a based on the signal output from the detector 120.

The first controller 130 may be configured to perform pairing with the first personal mobility 2a in response to receiving a pairing command with the first personal mobility 2a from the first input 111. When pairing with the first personal mobility 2a is successfully completed, the first controller 130 may be configured to store identification information of the first personal mobility 2a in the first storage 131. The first controller 130 may be configured to search for the paired first personal mobility 2a in response to receiving a communication connection command with the first personal mobility 2a through the first input 111 and when the paired first personal mobility 2a is searched, perform communication with the searched first personal mobility.

The first controller 130 may also be configured to determine whether the first personal mobility 2a is in a driving state or a stop state based on the speed of the first personal mobility 2a when the first personal mobility 2a is connected by communication. In addition, the first controller 130 may be configured to output driving information of the first personal mobility 2a to the first display 112. The first controller 130 may be configured to perform a navigation function in response to receiving the navigation information from the first input 111, and adjust the output of road guidance information to a destination based on the received navigation information.

The terminal may further include a sound output unit (not shown) configured to output operation information of terminal device 1 as sound. The sound output may be configured to output information regarding group riding as a sound. The group riding information may include operation information of the second personal mobility 2b, riding information, and the like. The sound output may be configured to output navigation information as sound when performing the navigation function. The sound output may also be configured to output charging request information of the first personal mobility 2a as a sound.

The first controller 130 may include a memory (not shown) configured to store data for an algorithm or a program that reproduces the algorithm for executing the operation of components in terminal device 1, and a processor configured to perform the above-described operation using the data stored in the memory (not shown). At this time, the memory and the processor may be implemented as separate chips, respectively. Alternatively, the memory and processor may be implemented as a single chip.

The first storage 131 may be configured to store identification information of the first personal mobility 2a and pairing information of the first personal mobility 2a. The first storage 131 may also be configured to store identification information of the second personal mobility 2b. The second personal mobility 2b may be a personal mobility that performs group riding with the first personal mobility 2a and may be a follower. The first storage 131 may be configured to store hand signal information corresponding to gesture information or intention information of the reader. In particular, the gesture information may be motion information of the terminal. The gesture information may be motion information of the body of the user wearing the terminal.

The first storage 131 may be implemented by a nonvolatile memory device such as cache, read only memory (ROM), programmable ROM (PROM), erasable programmable ROM (EPROM), electrically erasable programmable ROM (EPMROM), and flash memory or a volatile memory device such as RAM or a storage medium such as HDD (Hard Disk Drive), or CD-ROM, but is not limited thereto. The first storage 131 may be a memory implemented in a separate chip from the processor described above with respect to the first controller 130, or may be implemented in a single chip with the processor.

The first communicator 140 may be configured to transmit signals having information corresponding to the control command of the first controller 130 to the first personal mobility (2: 2a) and the second personal mobility (2: 2b). The first communicator 140 may also be configured to receive a signal for information transmitted from the first personal mobility (2: 2a) and transmit the received signal to the first controller 130.

The first communicator 140 may be configured to transmit a signal having information corresponding to the control command of the first controller 130 to the external device 3, and may transmit a signal for information transmitted from the external device 3 to the first controller 130. In particular, the external device 3 may include at least one of a server 3a, an infrastructure 3b, and a vehicle 3c. The first communicator 140 may include one or more components that enable communication with the personal mobility 2 and the external device 3, for example, at least one of a short-range communication module, a wired communication module, and a wireless communication module.

The short-range communication module may include various short-range communication modules that transmit and receive signals using a wireless communication network at a short distance such as Bluetooth module, infrared communication module, RFID (Radio Frequency Identification) communication module, WLAN (Wireless Local Access Network) communication module, NFC communication module, Zigbee communication module.

The wired communication module may include various cable communication modules such as Controller Area Network (CAN) communication module, Local Area Network (LAN) module, Wide Area Network (WAN) module or Value Added Network (VAN) module, etc., as well as various wired communication modules such as Universal Serial Bus (USB), High Definition Multimedia Interface (HDMI), Digital Visual Interface (DVI), recommended standard232 (RS-232), power line communication, or plain old telephone service (POTS), etc.

The wireless communication module may include a wireless communication module supporting various wireless communication methods such as Wifi module and Wireless broadband module, global system for mobile communication (GSM), Code Division Multiple Access (CDMA), Wideband Code Division Multiple Access (WCDMA), universal mobile telecommunications system (UMTS), TDMA (Time Division Multiple Access (LTE), Long Term Evolution (LTE), etc.

The wireless communication module may include a wireless communication interface including an antenna and a transmitter configured to transmit signals to personal mobility. In addition, the wireless communication module may further include a signal conversion module configured to modulate a digital control signal output from the controller into an analog type wireless signal via a wireless communication interface under control of the controller.

The wireless communication module may include a wireless communication interface including an antenna and a receiver be configured to receive signals of personal mobility. Additionally, the wireless communication module may further include a signal conversion module configured to demodulate the analog type wireless signal received via the wireless communication interface into a digital control signal.

The first communicator 140 may further include a GPS receiver configured to obtain the current location of terminal device 1. At least one component may be added or deleted in response to the performance of the components of the terminal illustrated in FIG. 1. In addition, it will be readily understood by those skilled in the art that the mutual location of components may be changed in response to the performance or structure of the system. Meanwhile, each component illustrated in FIG. 1 refers to software and/or hardware components such as a Field Programmable Gate Array (FPGA) and an Application Specific Integrated Circuit (ASIC).

Figure 2:
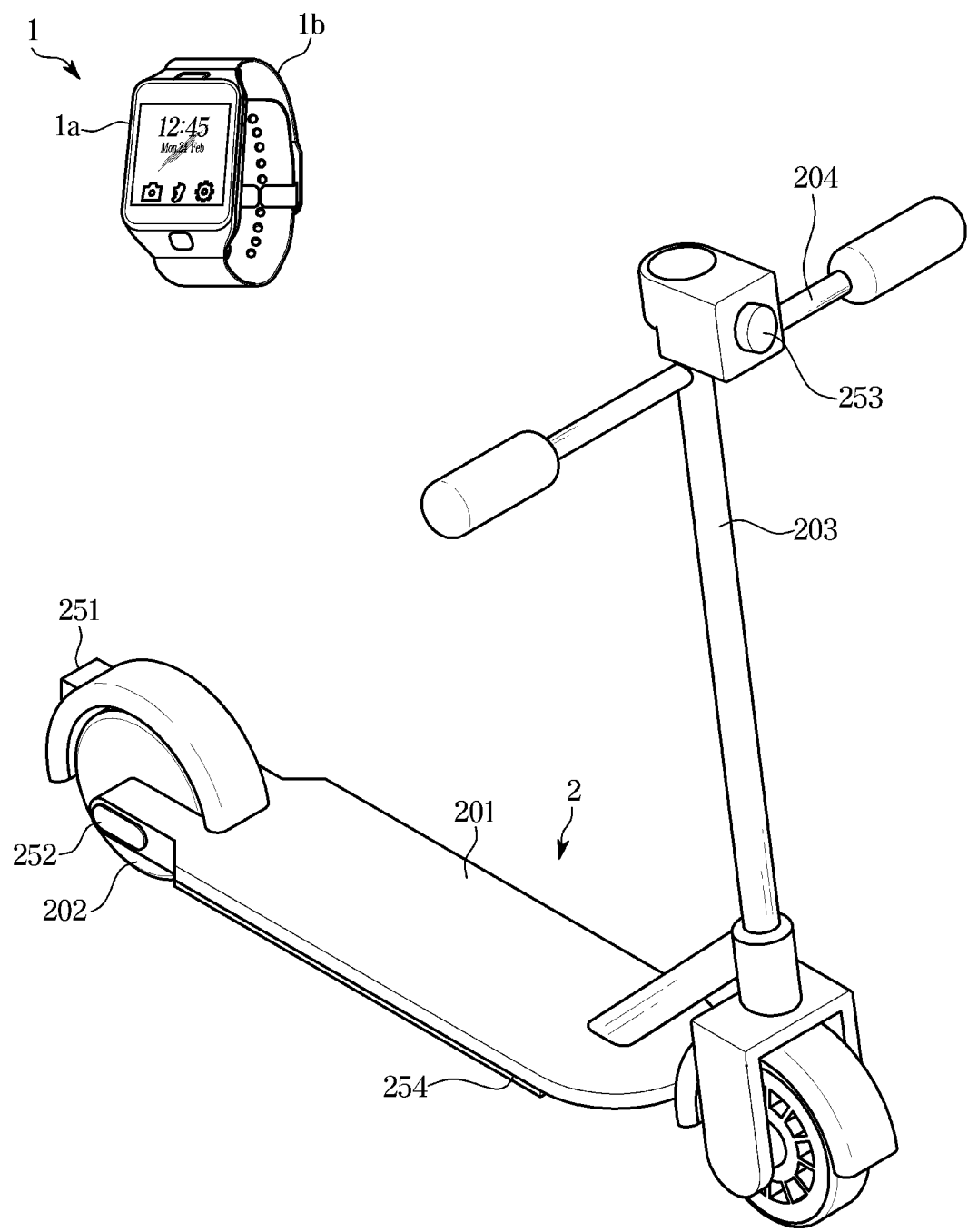
FIG. 2 is an exemplary diagram of a terminal according to an exemplary embodiment and personal mobility communicating with the terminal.

FIG. 2 is an exemplary diagram of a terminal device 1 according to an exemplary embodiment and personal mobility 2 communicating with the terminal device 1. As illustrated in FIG. 2, the terminal device 1, which is a watch type wearable device, may include a main body 1a having a first user interface and a band 1b formed to be worn on a wrist connected to the main body 1a.

The band 1b may be worn on the wrist to cover the wrist, and may be formed of a flexible material. As such an example, the band 1b may be formed of leather, rubber, silicone, synthetic resin material, or the like. In addition, the band 1b may be detachably attached to the main body 1a, the user may replace the band with various types of bands according to taste. The band 1b may be provided with a fastener. The fastener may be implemented by a buckle, a hook structure capable of snap-fit, or a velcro (trade name), and may include an elastic section or material.

As shown in FIG. 2, personal mobility 2 may include board 201 on which the user may stand, a wheel 202 provided at the lower side of the board 201, or a plurality of wheels 202 provided at the front and rear of the board 201, a support 203 connected to the wheel 202 and the board 201 and transmitting a force corresponding to the steering will to the wheel, and a handle connected to the support 203 and a force corresponding to the steering may be applied, and the user may grip, and may further include a brake pedal (or brake button) that is engaged by the user according to the user's braking intention, and an accelerator pedal (or accelerator button) engaged by the user according to the user's will to accelerate. The personal mobility 2 may include driving devices such as a power generating device, a braking device, and a steering device for applying a driving force and a braking force to one or a plurality of wheels 202. In addition, the power generating device may include a battery and a motor.

Figure 3:
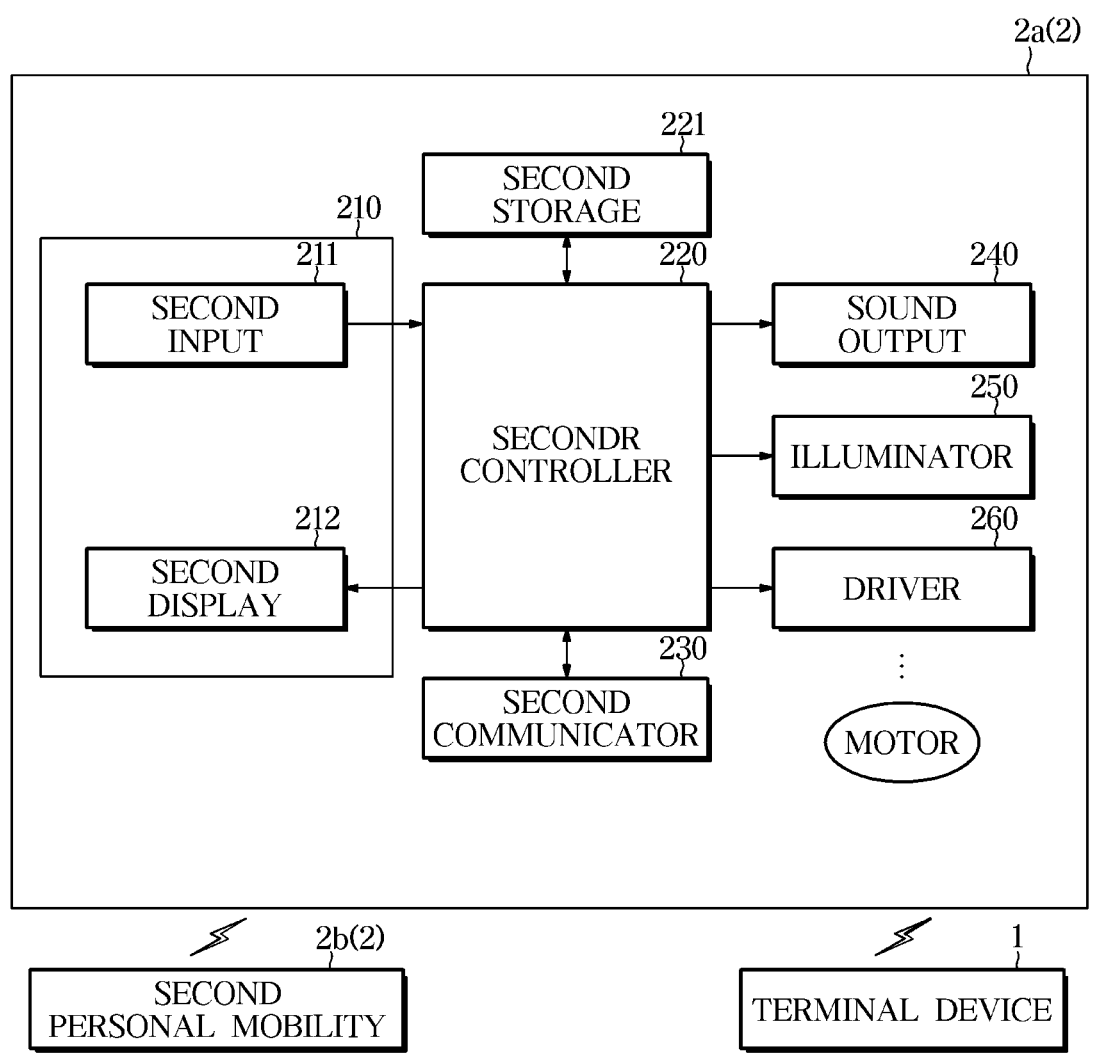
FIG. 3 is a control configuration diagram of personal mobility communicating with a terminal according to an exemplary embodiment.

FIG. 3 is a control configuration diagram of personal mobility communicating with a terminal device according to an exemplary embodiment. Personal mobility may be divided into a first personal mobility 2a driven by a leader and a second personal mobility 2b driven by a follower, The control configuration of the first personal mobility 2a and the control configuration of the second personal mobility 2b may be the same.

In the first personal mobility 2a, the status information of the personal mobility may be the leader status, and in the second personal mobility 2b, the status information of the personal mobility may be the follower status. The personal mobility 2 may include the second user interface 210, the second controller 220, the second storage 221, the second communicator 230, the sound output 240, the illuminator 250, and the driver 260.

The second user interface 210 may be configured to receive an operation command from the user and output operation information of the personal mobility 2. The second user interface 210 may also be configured to perform at least one of a navigation function, an audio function, a video function, a radio function, a web search function, a broadcast function (that is, a DMB function), and an internet function. The second user interface 210 may include a second input 211 configured to receive an operation command, and a second display 212 configured to output operation information.

The second input 211 may include a hardware device such as buttons, switches, pedals, keyboards, mice, track-balls, levers, handles or sticks for user input. The second input 211 may include a graphical user interface (GUI), such as a touch pad for user input, that is, a software device. The second input 211 may be configured to receive a power on/off command of personal mobility, a pairing command with terminal device 1, a start command, a stop command, a braking command, a steering command, a deceleration command, an acceleration command, an end command, speed information, and the like.

When the second input 211 is in the group riding mode, the second personal mobility 2b may be configured to receive status information regarding whether it is in a leader state or a follower state. The second display 212 may include a display panel of a flat panel configured to display operation information as an image. The second display 212 may also be configured to display operation on/off information of personal mobility. The second display 212 may be configured to display on-off information of the group riding mode and status information of personal mobility.

When performing the navigation function, the second display 212 may be configured to display at least one of map information, route information, current location information, driving speed information, destination information, and traffic information as an image. The second display 212 be configured to display communication connection information with terminal device 1 and communication connection information with other personal mobility, and display operation information of other personal mobility. The second display 212 may also be configured to display the charge amount information of the battery of the personal mobility. The second display 212 may be configured to display driving time, time remaining to the destination, and current time.

The second controller 220 may be configured to adjust the rotation of the motor when an operation command is input through the second input 211. The second controller 220 may be configured to adjust the power supplied to the motor by comparing the driving speed and the target speed of the personal mobility 2. Additionally, the second controller 220 may be configured to acquire the charge amount information of the battery based on the information detected by the charge amount detector (not shown) and operate the display of the obtained charge amount information of the battery.

The second controller 220 may be configured to generate route information based on current location information and destination information when a navigation function is selected and destination information is input, match the generated route information to the map information and adjust the output of the matched map information and route information. The second controller 220 may be configured to generate optimal route information using traffic information when generating route information.

Hereinafter, a control configuration of the second controller 220 of personal mobility during group riding will be described. When the status information of the personal mobility is the leader status, that is, the second controller 220 of the first personal mobility 2a will be described. The second controller 220 may be configured to perform pairing with the terminal 3 when the state mode for the reader state is selected, and perform communication with the terminal device 1 when pairing is completed.

When the second controller 220 receives gesture information from terminal device 1, the second controller 220 may be configured to check the reader's intention information corresponding to the received gesture information, and operate the second display 212 to display the intention information of the confirmed leader, and operate the second communicator 230 to transmit the intent information to the second personal mobility 2b. Particular, the gesture information may be information corresponding to the hand signal taken by the leader. And the intention information may include slow, stop, obstacle attention, right turn, left turn, overtaking, single line driving, two line driving, failure, charging, and the like.

The intention information may further include direction information for transmitting a hand signal. The second controller 220 may also be configured to recognize direction information from gesture information. The second controller 220 may be configured to check the direction in which the hand signal is to be transmitted among the intention information, and transmit the intention information to the second personal mobility 2b located in the identified direction.

Additionally, the second controller 220 may also be configured to receive information regarding the relative direction to the first personal mobility from the second personal mobility 2b, and receive location information of the second personal mobility 2b, it is also possible to obtain the direction of the second personal mobility 2b, which is a relative direction to the first personal mobility, based on the location information of the second personal mobility 2b and the location information of the first personal mobility.

The second controller 220 may also be configured to obtain the direction of the second personal mobility 2b based on the received signal strength of the second personal mobility 2b. The second controller 220 may be configured to accurately transmit intentions such as overtaking, slowing, turning left, and turning right of the first personal mobility by transmitting intention information according to the direction. The intention information may include information regarding at least one of acceleration, braking, slowing, stopping, rear-ward attention, forward attention, obstacle attention, left turn, right turn, overtaking, single line driving, and two line driving.

Overtaking and rear-ward attention include direction information corresponding to the front, slow, stop, obstacle attention, left turn, right turn information includes direction information corresponding to the rear, and single line driving, two line driving, failure, and charging may include direction information corresponding to the front and rear. The second controller 220 may be configured to recognize a gesture based on the received detection signal in response to receiving the detection signal of detector 120 during communication with the terminal, and confirm intention information corresponding to the recognized gesture information.

The second controller 220 may be configured to recognize the gesture based on the received detection signal, but check the number of times the same gesture is recognized, and may be configured to determine that the reader is a hand signal and check the intention information corresponding to the recognized gesture information in response to determining that the determined number of times is a preset number of times. The second controller 220 may be configured to recognize a gesture based on the received detection signal, and recognize the gesture based on the received detection signal and check intention information corresponding to the recognized gesture information in response to determining that the information regarding the recognized gesture is information on the starting gesture.

When checking the intention information corresponding to the gesture information, the second controller 220 may be configured to determine whether the intention information corresponding to the gesture information is stored among the information stored in the second storage unit, and in response to determining that the intention information corresponding to the gesture information is stored, it may also be possible to determine whether the identified intention information is intention information required to be transmitted to the second personal mobility.

The second controller 220 may be configured to transmit intention information to the second personal mobility in response to determining that the intention information is required to be transmitted to the second personal mobility. The second controller 220 may also be configured to transmit intention information to a second personal mobility located within a preset range. The second controller 220 may also be configured to transmit intent information to the second personal mobility that performs group riding In particular, the second personal mobility 2b may be a personal mobility disposed in front of the first personal mobility, or may be a personal mobility disposed behind the first personal mobility. The second controller 220 may be configured to execute the operation of at least one of the second display 212, the sound output 240, the illuminator 250, and the driver 260 based on the user input. In addition, the second controller 220 may be configured to operate at least one of the sound output 240, the illuminator 250, and the driver 260 based on the intention information.

For example, if the intention information is slow, the second controller 220 may be configured to operate the second display 212 so that information corresponding to the slow is displayed as an image, and operate the sound output 240 so that information corresponding to the slow motion is output as sound, and operate the illuminator 250 to light or blink in a color corresponding to the slow motion, and operate the driver 260 to reduce the driving speed. If the intention information is a right turn, the second controller 220 may be configured to operate the sound output unit 240 so that information corresponding to the right turn is output as sound, and operate the illuminator 250 so that the lamp is lit on the right turn.

The second controller 220 may be configured to recognize a gesture based on the received detection signal in response to receiving the detection signal transmitted from terminal device 1, and check the gesture information corresponding to the recognized gesture, confirm the leader's intention to respond to the identified gesture information, and operate the second display 212 to display intention information corresponding to the identified intention of the leader, and operate the second communicator 230 to transmit the intent information to the second personal mobility 2b.

When the state information of the personal mobility is in the follower state, that is, the second controller 220 of the second personal mobility 2b will be described. The second controller 220 may be configured to communicate with the first personal mobility 2a. The second controller 220 may be configured to execute the operation of at least one of the sound output 240, the illuminator 250, and the driver 260 based on the received intention information in response to receiving the intention information from the first personal mobility 2a.

As shown in FIG. 4, if the intention information is slow, the second controller 220 may be configured to operate the second display 212 so that information corresponding to the slow is displayed as an image, and operate the sound output 240 to output information corresponding to the slow motion as sound. In addition, the second controller 220 may be configured to operate the illuminator 250 to light or blink in a color corresponding to the slow motion, and operate the driver 260 to reduce the driving speed. The second controller 220 may be configured to operate the sound output 240 so that information corresponding to the right turn is output as sound if the received intention information is right turn, and operate the illuminator 250 so that the lamp is turned on when turning right.

The second controller 220 may include a memory (not shown) configured to store data for an algorithm or a program that reproduces the algorithm for executing the operation of components in personal mobility, and a processor configured to perform the above-described operation using the data stored in the memory (not shown). At this time, the memory and the processor may be implemented as separate chips, respectively. Alternatively, the memory and processor may be implemented as a single chip.

The second storage 221 may be configured to store intention information corresponding to gesture information. The second storage 221 may be configured to store operation information of at least one of sound output 240, illuminator 250, and driver 260 corresponding to intention information. The second storage 221 may be configured to store identification information of the paired terminal device 1 and further be configured to store identification information of other personal mobility performing group riding.

The second storage 221 may be a nonvolatile memory device such as cache, read only memory (ROM), programmable ROM (PROM), erasable programmable ROM (EPROM), electrically erasable programmable ROM (EPM-ROM), and flash memory or random access memory (RAM) Access Memory) may be implemented as a volatile memory device, but is not limited thereto. The second storage 221 may be a memory implemented in a separate chip from the processor described above with respect to the second controller 220, or may be implemented in a single chip with the processor.

The second communicator 230 may be configured to communicate with other personal mobility devices and terminal device 1. The second communicator 230 may include at least one of wired and wireless communication. The second communicator 230 may be configured to perform the same communication as the first communication unit. The second communicator 230 may further include a GPS receiver configured to obtain the current position of personal mobility. The sound output 240 may be configured to output a sound corresponding to the control command of the second controller 220. The sound output 240 may include a speaker. The illuminator 250 may include one or a plurality of lamps, and lights or flashes one or a plurality of lamps in response to a control command of the second controller 220.

As illustrated in FIG. 2, illuminator 250 may include braking indicator lamp 251, left direction indicator lamp, right direction indicator lamp 252, illumination lamp 253, warning notification lamp 254, and the like. The braking indicator lamp 251 may be provided on the rear wheel side, and a left-direction indicator lamp may be provided on the left side of the periphery of the rear wheel, the right direction indicator lamp 252 may be provided on the right side of the periphery of the rear wheel, the illumination lamp 253 may be provided adjacent to the handle, the warning notification lamp 254 may be provided at a position adjacent to the handle, on the side of the board 201 or on the bottom of the board. The driver 260 may be configured to rotate the motor based on the control command of the second controller 220. The driver 260 may be configured to change the rotation speed of the motor or stop the rotation of the motor according to the control command of the second controller 220.

FIG. 5 is a control flowchart of a terminal and first and second personal mobility according to an exemplary embodiment. When the movement of the terminal is detected (301) by the detector 120, the terminal may be configured to activate (302) the driving signal mode and initiate communication with the first personal mobility (2*a*). When the movement of the terminal is detected 301 by the detector 120 during communication with the first personal mobility, the terminal may be configured to recognize the gesture based on the detection signal (303).

The terminal may be configured to transmit the gesture information for the recognized gesture to the first personal mobility 2*a* (304), and deactivate (305) the driving signal mode. When the gesture information is received 306 from the terminal device 1, the first personal mobility 2*a* may be configured to check the intention information of the reader corresponding to the received gesture information (307), and transmit the confirmed intention information to the second personal mobility 2*b*.

The first personal mobility 2*a* may be configured to output the identified intention information through the second display 212 or sound output 240 provided in the first personal mobility 2*a* (309), so that the gesture recognized through the terminal is the reader's intention. The first personal mobility 2*a* may also be configured to operate (310) 310 at least one of the illuminator 250 and the driver 260 provided in the first personal mobility 2*a* based on the identified intention information.

When the intention information is received 311 from the first personal mobility 2*a*, the second personal mobility 2*b* may be configured to output (312) the received intention information through the second display 212 or sound output 240 provided in the second personal mobility 2*b*, so that the second personal mobility 2*b* allows the follower to recognize the hand signal taken by the leader. The second personal mobility 2*b* may also be configured to operate (313) at least one of the illuminator 250 and the driver 260 provided in the second personal mobility 2*b* based on the received intention information.

Examples of control of the first personal mobility 2*a* and the second personal mobility 2*b* for the leader's intention are as shown in FIG. 6. For example, when the leader performs a gesture that indicates an instruction to slow down, the terminal may be configured to recognize the gesture taken by the liter, and transmit gesture information for the recognized gesture to the first personal mobility 2*a*. In particular, the first personal mobility 2*a* may be configured to check intention information corresponding to the received gesture information, transmit the confirmed intent information to the second personal mobility 2*b*, and flash the brake lamp based on the identified intention information. The second personal mobility 2*b* may be configured to check the video information corresponding to the received intention information, and display the slow icon, which is the checked image information, on the second display, and flash the brake lamp based on the identified intention information.

As another example, when the leader performs a gesture that indicates an obstacle warning, the terminal may be configured to recognize the gesture gestured by the leader and transmit gesture information regarding the recognized gesture to the first personal mobility 2*a*. In particular, the first personal mobility 2*a* may be configured to check intention information corresponding to the received gesture information, transmit the confirmed intention information to the second personal mobility 2*b*, and flash the brake lamp based on the confirmed intention information, and output a warning sound. The second personal mobility 2*b* may be configured to check the video information corresponding to the received intention information, and display obstacle attention icon, which is the checked image information, and flash the brake lamp and output a warning sound based on the identified intention information.

Figure 7:
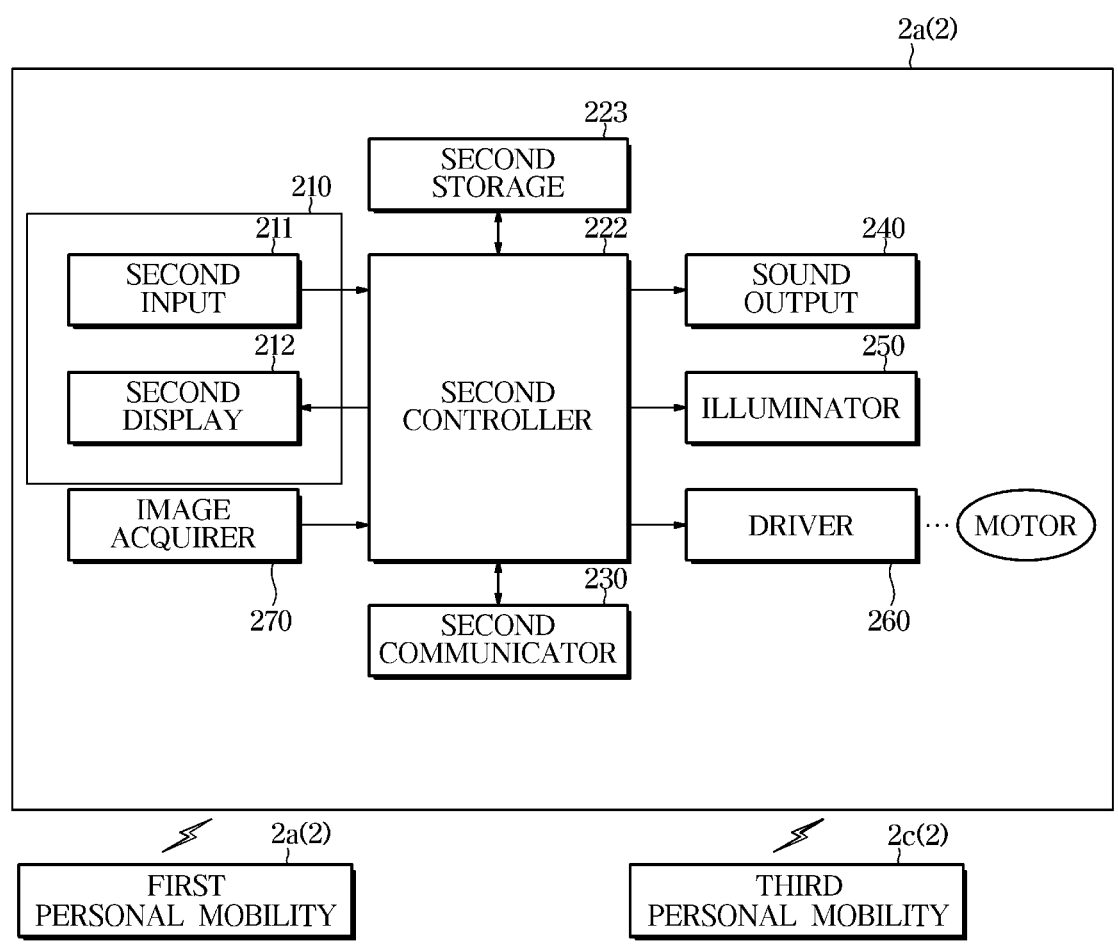
FIG. 7 is a control configuration diagram of personal mobility according to another exemplary embodiment.

FIG. 7 is a control configuration diagram of personal mobility according to another exemplary embodiment. Personal mobility may be divided into a first personal mobility 2a driven by a leader and a second personal mobility 2b driven by a follower, and the control configuration of the personal mobility 2a and the control configuration of the second personal mobility 2b may be the same. This exemplary embodiment describes the control configuration of the second personal mobility 2b.

The personal mobility 2b may include a second user interface 210, a second controller 222, a second storage 223, a second communicator 230, sound output 240, illuminator 250, driver 260, and image acquirer 270. In addition, the second user interface 210, second communicator 230, the sound output 240, the illuminator 250 and the driver 260 of the personal mobility 2b of another exemplary embodiment is the same as the second user interface 210, second communicator 230, sound output 240, illuminator 250 and driver 260 of the personal mobility of one exemplary embodiment, and a description thereof is omitted.

The image acquirer 270 may be configured to acquire an image of the first personal mobility 2a driving in front of the second personal mobility 2b. In particular, the first personal mobility 2a may be a personal mobility of the leader. The image acquirer 270 may be a camera, and may include a CCD or CMOS image sensor. The image acquirer 270 may be one camera, two cameras that acquire images of the first personal mobility 2a at different locations, or a three-dimensional camera.

The second controller 222 may be configured to acquire a two-dimensional image using the image acquired in the image acquirer 270, and determine whether a leader's hand and arm exist in the obtained two-dimensional image, recognize the gesture intended by the leader by checking the shape and direction of movement of the leader's hand and arm in response to determining that the leader exists.

The second controller 222 may be configured to acquire a 3D image using two 2D images collected from two cameras, determine if the leader's hand and arm are present in the acquired 3D image, and recognize the gesture intended by the leader by checking the shape and direction of movement of the leader's hand and arm in response to determining that the leader's hand and arm exist. The second controller 222 may be configured to determine whether a leader's hand and arm are present in the 3D image collected from the 3D camera, and recognize the gesture intended by the user by checking the shape and direction of movement of the leader's hand and arm in response to determining that the leader's hand and arm are present.

The second controller 222 may be configured to check intention information corresponding to gesture information for the recognized gesture when the gesture is recognized, and operate the second display 212 to display the confirmed intention information, and operate the second communicator 230 to transmit intent information to another personal mobility (2c, that is, the third personal mobility). The second controller 222 may be another personal mobility located within a preset range, or another personal mobility performing group riding with personal mobility.

Particularly, the preset range may include an area within a distance capable of visually recognizing a gesture of a user of different personal mobility among all directions in front, rear, left, and right based on the second personal mobility. In the preset range, a direction and a distance may be set according to a user's selection. The preset range may be variably set according to environmental information such as weather, season, and time.

The second controller 222 may be configured to recognize the gesture based on the image information, but check the number of times the same gesture is recognized. In response to determining that the number of times is a preset number of times, intention information corresponding to gesture information for the recognized gesture may be checked. The second controller 222 may be configured to recognize the gesture based on the image information, and in response to determining that the information regarding the recognized gesture is information on the starting gesture, it may be possible to recognize the gesture based on the received image information and check intention information corresponding to the recognized gesture information.

The second controller 222 may be configured to recognize a gesture based on the received image information, in response to determining that the information regarding the recognized gesture is information on the starting gesture, the driving signal mode is activated. Thereafter, a gesture may be recognized based on the received image information, and intention information corresponding to the recognized gesture information may be confirmed. The second controller 222 may also be configured to execute the operation of at least one of sound output 240, illuminator 250, and driver 260 based on the intention information.

The second storage 223 may be configured to store intention information corresponding to the gesture information, icon information that corresponds to the intention information, and warning sound information. The second storage 223 may be configured to store operation information of the second display 212 and sound output 240 corresponding to the intention information, and further store operation information of illuminator 250 and driver 260.

The second personal mobility may also be selected a recognition mode for recognizing a gesture. The recognition mode for recognizing the gesture may include a transmission mode for receiving gesture information from the first personal mobility, and an image mode for recognizing gesture information through the image acquired by the image acquirer. If the size of the first personal mobility in the image is greater than or equal to a particular size, the second personal mobility may be configured to recognize the gesture through the image acquired by the image acquirer and check intention information corresponding to the gesture information for the recognized gesture, and if the size of the first personal mobility in the image is less than a predetermined size, the second personal mobility that resumed the communication with the first personal mobility, may be configured to receive the gesture information from the first personal mobility, and check the intention information corresponding to the received gesture information.

The second personal mobility may be configured to recognize a gesture through the image acquired by the image acquirer and check the intention information corresponding to the gesture information for the recognized gesture when the size of the first personal mobility in the image is greater than a particular size. The second personal mobility may resume communication with the first personal mobility 2a, may be configured to receiving the gesture information from the first personal mobility 2a, and confirm intention information corresponding to the received gesture information when the size of the first personal mobility in the image is less than a particular size. In particular, the size of the first personal mobility in the image may be used as information for obtaining a distance from the first personal mobility.

The second personal mobility compared to the location information of the second personal mobility, may be configured to obtain the distance to the first personal mobility 2a mobility when location information is received from the first personal mobility. In response to determining that the acquired distance is greater than the reference distance, the second personal mobility may be configured to recognize the gesture through the image acquired by the image acquirer and check the intention information corresponding to the gesture information for the recognized gesture. In response to determining that the acquired distance is less than the reference distance, the second personal mobility may resume communication with the first personal mobility and may be configured to receive gesture information from the first personal mobility and confirm intention information corresponding to the received gesture information.

Figure 8:
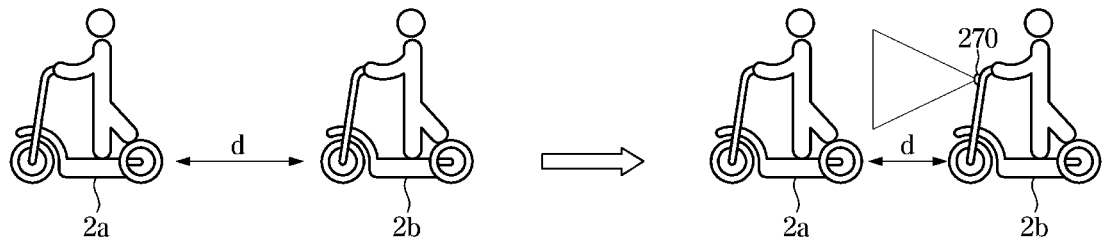
FIG. 8 is a diagram of gesture recognition in personal mobility according to another exemplary embodiment.

As illustrated in FIG. 8, the second personal mobility may further include a distance detection unit configured to detect a distance from the first personal mobility. If the distance (d) detected by the distance detector is greater than or equal to the reference distance the second personal mobility may be configured to recognize gestures through images acquired by the image acquisition unit, and check the intention information corresponding to the gesture information for the recognized gesture. If the detected distance is less than the reference distance, the second personal mobility may resume communication with the first personal mobility and receive gesture information from the first personal mobility and confirm intention information corresponding to the received gesture information.

If the first personal mobility is unable to communicate with the terminal, or if the terminal does not exist in the reader, the second personal mobility may be configured to activate the image acquirer, recognize the leader's gesture based on the image acquired by the activated image acquirer and check the intention information corresponding to the recognized gesture The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

In accordance with an aspect of the present disclosure, it may be possible to provide a vehicle and a controlling method thereof capable of providing efficient autonomous driving by changing the detection range and power consumption of the sensor according to the speed of the vehicle. The present exemplary embodiment enables the entire group to safely ride by recognizing the leader's hand signal through the terminal and transmitting information regarding the recognized hand signal to the follower's personal mobility during group riding.

According to the present exemplary embodiment, the information transmitted from the leader's personal mobility may be displayed through the follower's personal mobility, so that the follower may recognize the traffic conditions and obstacles in front, thereby preventing traffic accidents and collisions with obstacles.

According to the present exemplary embodiment, a signal may be intuitively transmitted without a cognitive load and a deviation from the front line of sight through a natural user interaction (NUI) called a hand signal. As described above, the present embodiment may perform communication between the leader and the follower through the hand signal of the leader.

The present exemplary embodiment allows a follower to safely ride by recognizing the reader's hand signal using a camera and displaying information on the recognized hand signal. According to the present exemplary embodiment, by transmitting information on a hand signal recognized by a terminal or personal mobility to a surrounding vehicle, a surrounding infrastructure, and a server, a communication function for a road situation and a traffic situation may be performed in connection with other devices in the surroundings.

As described above, the present exemplary embodiment may improve the quality and product-ability of the terminal and personal mobility by providing signals to other users, and further increase the user's satisfaction and secure the competitiveness of the product.

DESCRIPTION OF SYMBOLS

1: terminal device
2, 2a, 2b, 2c: personal mobility
1a: main body
1b: band
201: board
202: wheel

What is claimed is:

1. A personal mobility, comprising:
a display;
a communicator configured to perform communication with a terminal device and other personal mobility devices;
a storage configured to store intention information corresponding to gesture information; and
a controller configured to:
  activate a driving signal mode when a gesture corresponding to the gesture information received through the communicator is a starting gesture, in response to receiving the gesture information through the communicator during the driving signal mode,
  identify the intention information corresponding to the received gesture information based on information stored in the storage, control the communicator to transmit the identified intention information to the other personal mobility devices, and
  control the display to display the identified intention information.

2. The personal mobility according to claim 1, wherein the controller is configured to check a direction to transmit the intention information based on the identified gesture information, and transmit the identified intention information to one of the other personal mobility devices located in the checked direction among the other personal mobility devices.

3. The personal mobility according to claim 2, wherein the direction to transmit the identified intention direction is a relative direction to the personal mobility.

4. The personal mobility according to claim 2, wherein the communicator is configured to receive present location information and location information of one of the other personal mobility devices, and the controller is configured to recognize direction of the one of the other personal mobility devices based on the received present location and the location information of the one of the other personal mobility devices by the communicator.

5. The personal mobility according to claim 1, wherein: the identified intention information includes at least one of acceleration, braking, slow riding, stop, rearward-attention, forward-attention, obstacle attention, left turn, right turn, overtaking, single line driving, and two line driving.

6. The personal mobility according to claim 5, wherein: wherein the identified intention information includes direction information corresponding to a transmission direction for transmitting the identified intention information,
wherein the overtaking and rearward-attention includes the direction information corresponding to a front side of the personal mobility,
wherein the slow riding, obstacle attention, left turn, right turn includes direction information corresponding to a rear side of the personal mobility, and
wherein the single line driving, two line driving, failure and charging includes the direction information corresponding to the front side of the personal mobility and rear side of the personal mobility.

7. The personal mobility according to claim 1 further comprising:
an illuminator configured to perform turning on light, turning off light, or flashing; and
a sound output configured to output sound, and
wherein the controller is configured to execute at least one of actions of the illuminator and the sound output based on the identified intention information.

8. The personal mobility according to claim 1, wherein the other personal mobility devices includes one personal mobility located within a preset range.

9. The personal mobility according to claim 8, wherein the controller is configured to control the communicator to transmit the identified intention information to the other personal mobility devices when the other personal mobility devices are in a group riding state.

10. The personal mobility according to claim 1, wherein the controller is configured to recognize the gesture by the received gesture information and check the number of times the same gesture was recognized, and identify the intention information corresponding to the recognized gesture in response to determining that the identified number of times is a preset number of times.

11. The personal mobility according to claim 1 further comprising:
a board;
at least one wheel provided on the board and rotated by a motor;
a brake indicator lamp provided on a rear side of the board, a left direction indicator lamp provided on a left side of the board, a right direction indicator lamp provided on a right side of the rear side of the board, and a warning indicator lamp provided on a bottom surface of the board.

12. The personal mobility according to claim 11, wherein, when the personal mobility is in follower state while performing a group riding mode, the controller is configured to adjust operation of the motor based on the identified intention information.

13. The personal mobility according to claim 1 further comprising:
an image acquirer configured to acquire a front side image,
wherein the controller is configured to identify a movement direction of arms and hands of a leader based on the acquired image when the personal mobility is in the follower state while performing a group riding mode, identify the gesture information of the leader based on the identified movement direction of arms and hands of the leader, and identify the intention information corresponding to the identified gesture information of the leader.

14. The personal mobility according to claim 13, wherein, when the personal mobility is in the follower state while performing the group riding mode, the controller is configured to check a size of a personal mobility that is the leader state in the acquired image identify the gesture information based on the acquired image when the checked size is a predetermined size or more, and receive the gesture information from the personal mobility in the leader state when the checked size is less than the predetermined size.

15. The personal mobility of claim 13 further comprising:
a distance detector configured to detect a distance with a personal mobility in the leader state,
wherein, when the personal mobility is in the follower state while performing the group riding mode, the controller is configured to identify the gesture information based on the acquired image when the detected distance is more than a predetermined distance, and receive the gesture information from the personal mobility in the leader state when the detected distance is less than the predetermined distance.

* * * * *